(12) United States Patent
Schaefer et al.

(10) Patent No.: US 9,963,538 B2
(45) Date of Patent: May 8, 2018

(54) CATALYSTS FOR POLYURETHANE COATING COMPOUNDS

(71) Applicant: BASF SE, Ludwigshafen (DE)

(72) Inventors: Harald Schaefer, Mannheim (DE); Andreas Eichfelder, Maxdorf (DE); Boris Gaspar, Zurich (CH); Thorsten Pauen, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 14/654,734

(22) PCT Filed: Dec. 18, 2013

(86) PCT No.: PCT/EP2013/077123
§ 371 (c)(1),
(2) Date: Jun. 22, 2015

(87) PCT Pub. No.: WO2014/106578
PCT Pub. Date: Jul. 10, 2014

(65) Prior Publication Data
US 2015/0322289 A1 Nov. 12, 2015

(30) Foreign Application Priority Data

Jan. 7, 2013 (EP) ..................................... 13150393

(51) Int. Cl.
| | | |
|---|---|---|
| B05D 3/02 | (2006.01) |
| C08G 18/62 | (2006.01) |
| C08G 18/79 | (2006.01) |
| C08G 18/20 | (2006.01) |
| C09D 175/04 | (2006.01) |

(52) U.S. Cl.
CPC ..... *C08G 18/6225* (2013.01); *C08G 18/2027* (2013.01); *C08G 18/792* (2013.01); *C09D 175/04* (2013.01)

(58) Field of Classification Search
CPC ............ C08G 18/6225; C08G 18/2027; C08G 18/792; C09D 175/04
See application file for complete search history.

(56) References Cited

U.S. PATENT DOCUMENTS

| | | |
|---|---|---|
| 4,596,678 A | 6/1986 | Merger et al. |
| 4,596,679 A | 6/1986 | Hellbach et al. |
| 5,087,739 A | 2/1992 | Bohmholdt et al. |
| 2012/0152458 A1 | 6/2012 | Rajendran |
| 2012/0156474 A1 | 6/2012 | Rajendran |
| 2012/0157688 A1 | 6/2012 | Rajendran |
| 2012/0288632 A1 | 11/2012 | Neu et al. |
| 2013/0253164 A1* | 9/2013 | Wiss .................... C08G 63/685 528/271 |

FOREIGN PATENT DOCUMENTS

| | | |
|---|---|---|
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 355 443 A2 | 2/1990 |
| EP | 0 403 921 A2 | 12/1990 |
| EP | 1 389 221 A1 | 2/2004 |
| JP | 2006-152154 A | 6/2006 |
| JP | 2008-201703 A | 9/2008 |
| WO | WO 02/092656 A1 | 11/2002 |
| WO | WO 03/093246 A1 | 11/2003 |
| WO | WO 2004/076519 A1 | 9/2004 |
| WO | WO 2004/076520 A1 | 9/2004 |
| WO | WO 2005/087828 A1 | 9/2005 |
| WO | WO 2006/084880 A1 | 8/2006 |
| WO | WO 2007/039133 A1 | 4/2007 |
| WO | WO 2007/062953 A1 | 6/2007 |
| WO | WO 2007/090755 A1 | 8/2007 |
| WO | WO 2008/006422 A2 | 1/2008 |
| WO | WO 2008/068198 A1 | 6/2008 |
| WO | WO 2008/076302 A1 | 6/2008 |
| WO | WO 2008/116893 A1 | 10/2008 |
| WO | WO 2008/116894 A1 | 10/2008 |
| WO | WO 2008/116895 A1 | 10/2008 |
| WO | WO 2008/133668 A2 | 11/2008 |
| WO | WO 2009/010502 A1 | 1/2009 |
| WO | WO 2009/016322 A2 | 2/2009 |
| WO | WO 2009/027250 A2 | 3/2009 |
| WO | WO 2009/040242 A1 | 4/2009 |
| WO | WO 2009/074535 A2 | 6/2009 |
| WO | WO 2011/061314 A1 | 5/2011 |
| WO | WO 2012/088148 A2 | 6/2012 |
| WO | WO 2012/088163 A2 | 6/2012 |
| WO | WO 2013/144056 A1 | 10/2013 |

OTHER PUBLICATIONS

International Search Report and Written Opinion dated Mar. 3, 2014 in PCT/EP2013/077123 (with partial English language translation).
Bhasker Bantu, et al., "$CO_2$, Magnesium, Aluminum, and Zinc Adducts of N-Heterocyclic Carbenes as (Latent) Catalysts for Polyurethane Synthesis" Eur. J. Inorg. Chem., 2009, pp. 1970-1976.
Bhasker Bantu, et al., "$CO_2$ and $Sn^{II}$ Adducts of N-Heterocyclic Carbenes as Delayed-Action Catalysts for Polyurethane Synthesis" Chem. Eur. J., 2009, pp. 3103-3109.
Shadpour Mallakpour, et al., "Reaction of Aromatic Carboxylic Acids with Isocyanates using Ionic Liquids as Novel and Efficient Media" Journal of Brazilian Chemical Society, vol. 18, No. 6, 2007, pp. 1220-1223.

* cited by examiner

*Primary Examiner* — Robert S Walters, Jr.
(74) *Attorney, Agent, or Firm* — Oblon, McClelland, Maier & Neustadt, L.L.P.

(57) ABSTRACT

The present invention relates to new catalysts for curing solventborne or solvent-free coating compositions, such as 2-component polyurethane coating materials or 2-component polyurethane adhesives.

8 Claims, No Drawings

CATALYSTS FOR POLYURETHANE COATING COMPOUNDS

The present invention relates to new catalysts for curing solventborne or solvent-free coating compositions, such as 2-component polyurethane coating materials or 2-component polyurethane adhesives.

In order to accelerate the curing of coating compositions for polyurethane coating materials it is possible to add to them, as catalysts for the reaction of isocyanate groups and polyol groups, a multiplicity of metal compounds, especially heavy metal compounds. This becomes necessary especially when using constituents of low viscosity/low molecular mass, in order to achieve practical progress in curing. A substitute for these compounds is sought for reasons of toxicology and/or of occupational health and hygiene. Particularly critical from a toxicological standpoint are organotin compounds, especially dialkyltin compounds, more particularly dibutylditin dilaurate (DBTL).

WO 2011/061314 describes methods for coating substrates with coating compositions, comprising
  in a first step applying to the substrate in the desired thickness at least one coating composition comprising
  (A) at least one polyisocyanate obtainable by reacting at least one monomeric isocyanate,
  (B) at least one compound which has at least two isocyanate-reactive groups, a number-average molecular weight Mn of at least 1000 g/mol, and an OH number of 40 to 350 mg KOH/g,
  (C) at least one imidazolium salt,
  (D) optionally at least one solvent,
  (E) optionally at least one urethanization catalyst other than (C), and
  (F) optionally other, typical application components and/or additives, said imidazolium salt (C) having the formula

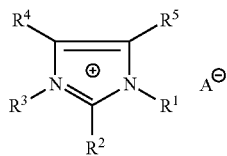

in which $R^1$ and $R^3$ independently of one another are an organic radical having 1 to 20 C atoms,
$R^2$, $R^4$ and $R^5$ independently of one another are an H atom or an organic radical having up to 20 C atoms, and $A^-$ is an anion,
  optionally drying the coating composition applied to the substrate, by at least partly removing volatile constituents, followed by
  curing the coating composition applied to the substrate.

Possible anions $A^-$ are designated from page 20 line 28 to page 25 line 25. These may therefore be, in line with page 24 lines 23-28, carboxylate anions, which are anions of aliphatic or aromatic carboxylic acids, preferably aliphatic carboxylic acids. Examples given of aromatic carboxylic acids are benzoate, salicylate, and nicotinate, but these are not supported by explicit examples. Claim 8 designates explicitly and exclusively examples of aliphatic carboxylate anions. At page 20 line 32, with reference to WO 2007/090755, page 20 line 36 to page 24 line 37, reference is made to further anions. There as well, aromatic carboxylates are not mentioned.

An advantage of the imidazolium salts with aliphatic carboxylates is that they can replace organometallic catalysts and have an improved ratio of curing to processing life relative to the organometallic catalysts.

A disadvantage of the imidazolium salts with aliphatic carboxylates is that, as shown in tables 3 and 4 on page 40 of WO 2007/090755, the pendulum hardnesses on curing of a polyisocyanate containing the commercially customary polyacrylate polyol JONCRYL® 507 from BASF SE, Ludwigshafen, for 30 minutes at 60° C.+24 hours at room temperature, relative to 30 minutes at 40° C.+24 hours at room temperature, are poorer in seven out of 10 examples. Normally, in the case of a higher temperature, higher pendulum hardnesses as well are obtained after the same curing time. Users must be able to rely on this expected curing and drying behavior.

Also advantageous would be a more rapid development of hardness relative to the examples given in WO 2007/090755.

WO 2008/076302 describes radiation-curable coating compositions comprising polyurethane acrylate oligomers obtained by reacting isocyanates with alcohols. Among the catalysts mentioned, within long lists, are imidazolium salts such as 1-butyl-3-methylimidazolium acetate. Used explicitly in the examples is dibutyltin dilaurate. The specific substitution of toxic Lewis acids such as dibutyltin dilaurate and the achievement of a preferred curing behavior of isocyanates with polyols are not described. Moreover, the preparation only of polyurethane prepolymers is described, but not the curing of polyurethane coating materials. The disclosure content of WO 2008/133668 is similar, it likewise describing polyurethane prepolymers formed from polyisocyanates and polyalkylene glycols with an Mn of 300 to 5000.

WO 2007/090755 and WO 2009/010502 describe polyurethanes formulated to have antistatic properties using ionic liquids such as ethylmethylimidazolium ethylsulfate, for example. The ionic liquid ethylmethylimidazolium ethylsulfate functions here exclusively as an antistat, to increase the conductivity of the polymer. There is a functionally and substantively separate listing of customary catalysts for the reaction of polyisocyanate and polyol to form polyurethanes. Although ethylmethylimidazolium ethylsulfate is present when the polyurethane is formed, there is no indication of any possible catalytic effect in the preparation of polyurethanes, and more particularly no reference to coating materials or coating-film properties.

WO 2003/093246 describes ionic liquids comprising ammonium or phosphonium cations and an anion of a five-membered nitrogen heteroaromatic as a solvent and catalyst for the oligomerization of isocyanates. In that reaction, monomeric isocyanates are reacted with themselves in a cyclization reaction to form their oligomers, dimers (uretdione), and trimers (isocyanurate, iminooxadiazinedione).

Nitrogen heteroaromatic cations as a component of ionic liquids are not described. Similarly, EP 1389221 describes the use of triazolate structures for the reaction of isocyanate groups with other isocyanate groups.

WO 2006/084880 describes the at least partial oligomerization of diisocyanates for preparing polyisocyanates comprising isocyanurate groups, biuret groups or allophanate groups, in the presence of at least one oligomerization catalyst, which is an ionic liquid, imidazolium cations among others. Suitability as urethanization catalysts, and advantages in the context of the operation of curing polyisocyanates and polyols in a coating-material application, or coating-material applications per se, are not described.

WO 2007/062953 claims aqueous resin dispersions obtainable by reacting hydroxyl-containing ketone resins, ketone/aldehyde resins, urea/aldehyde resins or their hydrogenated derivatives and at least one di- or polyisocyanate and at least one ionic liquid which has a function that is reactive toward isocyanate groups, and which possesses additional functional groups, and subsequently combining the resin with water.

The ionic liquids that can be incorporated are employed as emulsifiers and serve for functionalization and also for conversion of organic resins into stable aqueous solutions, dilutions, and dispersions.

Disclosed distinctly and separately therefrom in functional terms are conventional catalysts for the reaction of the above components.

There is no reference to any possible catalytic effect of the ionic liquids, to any substitution of toxic catalysts such as DBTL, or to any possible use in solventborne 2-component polyurethane coating materials having good curing behavior and good coating-film properties.

WO 2008/006422 describes the use of ionic liquids and of metal salts in ionic liquids as antistats in plastics.

For the preparation of polyurethanes by reaction of polyol and polyisocyanate in the presence of ionic liquids, the customary urethanization catalyst triethylenediamine is described.

There is no reference to any possible catalytic effect of the ionic liquids on the urethanization reaction, or to advantages in connection with preparation of or use in coating materials.

WO 2009/016322 describes a process for preparing urethanes from isocyanates and hydroxy compounds in the presence of a carbene as catalyst for the substitution of toxic organometallic catalysts.

The catalytically active species are explicitly carbenes on the C2 carbon of the imidazolium ring that can be used in isolation or in situ.

The use of imidazolium salts as a catalyst for the urethanization reaction, the reaction of polyisocyanates and polyols to form coating materials, and, optionally, advantages in connection with curing to form coating materials, are not described.

Buchmeiser et al, Eur. J. Inorg. Chem. 2009, 1970-1976 describe the use of $CO_2$ and adducts of magnesium, of aluminum, and of zinc with N-heterocyclic carbenes as (latent) catalysts in polyurethane synthesis. These catalysts require a separate synthesis step and have to be handled under nitrogen in a glove box, which is costly and inconvenient and which disqualifies them from practical application. Moreover, these catalysts require elevated temperatures, which makes room-temperature curing impossible.

Buchmeiser et al, Chem Eur. J. 2009, 15, 3103-3109 describe organotin(II) adducts with N-heterocyclic imidazolium carbenes as pronouncedly latent (delayed-action) catalysts. Scheme 2 depicts a mechanism of action which compares the carbenes as catalytically active species with the catalytically inactive imidazolium ions.

JP 2008 201703 describes imidazolium salts for use in drugs, crop protection compositions, and electrolyte solutions, and as catalysts for the curing of resins such as epoxy or polyurethane resin, but these are not supported by any explicit example.

There is no reference to a catalytic activity of the imidazolium salts thus prepared for the reaction of polyisocyanates and polyols for use in coating materials, or to alternative use in relation to the customary Lewis acid catalysts such as DBTL.

JP 2006 152154 describes the use of ionic liquids in binders and their use in pressure-sensitive adhesive layers for electronic components with antistatic properties. One example given of an ionic liquid, among others, is 1-methyl-3-butylimidazolium halide. Also disclosed is a reaction of a polyacrylateol with a polyisocyanate. Catalytic properties of the ionic liquids are not described, and nor is the improvement of curing properties or the application of coating materials, or use in polyisocyanates or mixtures of polyisocyanates and polyols directly prior to application.

Journal of the Brazilian Chemical Society, 2007, 18(6), 1220-1223, describes the amidation of isocyanates with aromatic carboxylic acids in the presence of ionic liquids as a reaction medium. As compared with other solvents such as N,N-dimethylformamide, N-methyl-pyrrolidone, and toluene, higher yields are obtained, and a positive effect of the ionic liquids is cited. The reaction in principle of isocyanates with amines, alcohols, and acids, however, is disclosed only generally and not explicitly. The ionic liquids as solvents may replace catalysts in the reactions.

A disadvantage is that the stated halides may induce corrosion in the case of coating materials on metal substrates.

It was an object of the present invention to develop new catalysts for coating with two-component polyurethane coating materials that are able to replace the customary organometallic catalysts, more particularly toxic and organotin compounds, of the prior art and that, in addition, produce improved curing and/or coating properties.

Another object of the present invention, therefore, was to develop catalysts which have good initial drying behavior and/or rapid development of hardness at a low temperature, more particularly below 60° C., and/or with a short curing time.

The examples given of imidazolium catalysts in tables 3 and 4 on page 40 of WO 2007/090755, with aliphatic carboxylates, 1,3-diisopropylimidazolium acetate and pentamethylimidazolium acetate, are not soluble in butyl acetate, and instead have to be dissolved in acetone. They also have to be incorporated at greater energy input, with a Dispermat, and not by hand.

A further object of the present invention, accordingly, was to find new, effective catalysts having good solubility in the solvents and polyol components and isocyanate components employed in coatings technology. Such a catalyst ought preferably to be liquid at room temperature.

A further object of the present invention was to find a catalyst which develops a low color in the coating material.

In the results shown in tables 3 and 4 on page 40 of WO 2011/061314, with the curing of a polyisocyanate containing the polyacrylate polyol JONCRYL® 507, with the imidazolium carboxylates with aliphatic carboxylates that are described therein, after curing at elevated temperature, the pendulum hardnesses were slightly lower in seven out of ten examples than for the 40° C. values. Of the three examples at which higher pendulum hardnesses were achieved at 60° C., two were the aforementioned catalysts of low solubility, which are therefore unsuitable. In particular, therefore, the new catalysts are to be effective relative to the known imidazolium salts with aliphatic carboxylates, at temperatures below 110° C., over the entire temperature range, and are to undergo through-curing more effectively as the curing temperature rises. This is important for all applications which necessarily (large components) or preferably (energy saving) take place at relatively low baking temperatures, in other words below 110° C., preferably below 80° C., more particularly below 60° C., very preferably below 40° C.

Particularly in the case of unfilled, pigment-free high-solids systems with a solids content of >58% (for a flow time of 20 seconds from the DIN 4 cup at 23° C.), low-viscosity polyols and/or low-viscosity polyisocyanates are frequently employed. In order to achieve this, these systems in particular possess lower molar masses, lower glass transition temperatures and/or lower functionalities in relation to conventional products for standard (medium-solids) systems. This is detrimental to the curing behavior of the coating. In these cases, a more rapid reaction and/or more rapid through-curing, or better ultimate properties or higher ultimate hardness, are of particular advantage, with the aid of catalysts. New catalysts are to be developed in particular for systems of these kinds.

Probably the most widespread such compound in the art is currently DBTL (dibutyltin dilaurate), which has adverse toxic properties in a variety of respects. As a remedy, the less toxic, homologous DOTL (dioctyltin dilaurate) is favored. Other tin-free metal complex catalysts are encountered on the market.

The objects have been achieved by means of a method of coating substrates with coating compositions, comprising
in a first step coating the substrate with at least one coating composition comprising
(A) at least one polyisocyanate obtainable by reacting at least one monomeric isocyanate,
(B) at least one binder which has at least two isocyanate-reactive groups, a number-average molecular weight Mn of at least 1000 g/mol, and an OH number of 40 to 350 mg KOH/g,
(C) at least one imidazolium salt,
(D) optionally at least one solvent,
(E) optionally at least one urethanization catalyst other than (C), and
(F) optionally other, typical application components and/or additives, said imidazolium salt (C) having the formula

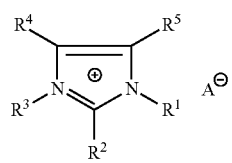

in which $R^1$ and $R^3$ independently of one another are an organic radical having 1 to 20 C atoms,
$R^2$, $R^4$ and $R^5$ independently of one another are an H atom or an organic radical having up to 20 C atoms,
and $A^-$ is the anion of an aromatic or heteroaromatic carboxylic acid,
optionally drying the coating composition applied to the substrate, followed by
curing the coating composition applied to the substrate.

1-Ethyl-3-methylimidazolium benzoate as a particularly preferred catalyst of the invention is liquid, highly soluble in butyl acetate, and results in less yellowing (see examples) in the coating, in comparison to corresponding acetates.

The solubility of imidazolium carboxylates in polyisocyanates is poor. Even in the case of liquid, possibly colorless imidazolium carboxylates with aliphatic carboxylates, colored, red streaks are formed in some cases (1-ethyl-3-methylimidazolium acetate (amber); 1,3-diethylimidazolium acetate (colorless); 1,3-diethylimidazolium octanoate (amber)). In contrast, the imidazolium carboxylate of the invention, with aromatic carboxylate, 1-ethyl-3-methylimidazolium benzoate, is only yellowish, with a haze, when stirred by hand into an isocyanurate-group-containing polyisocyanate of a kind in standard use, such as BASONAT® HI 100 from BASF SE, for example.

Dissolution of the catalyst in the solvent or polyol is generally preferred.

Coating materials with catalysts of the invention have a higher temperature stability in relation to the color than those prepared using imidazolium carboxylate with aliphatic anions. Samples from gelling tests (internal diameter~1.8 cm, length~11 cm) underwent, optically, yellowish to yellow coloration in the case of imidazolium carboxylates with aliphatic carboxylates as catalyst, within one day or after storage at room temperature for 14 days, whereas a corresponding sample with 1-ethyl-3-methylimidazolium benzoate as catalyst was still colorless even after 14 days.

A feature of the method of the invention is that high hardness is achieved for the coating system especially at low cure temperatures of below 110° C., preferably less than 80° C., more preferably less than 60° C., and in a short curing time (see examples). The hardness exceeds the values achieved with common catalysts, especially DBTL, in the same gelling time or processing life, for example (see examples). As compared with curing using DBTL, for example, this permits earlier processing times for the applied coatings dried at the same temperature, or lower curing temperatures.

As compared with other imidazolium carboxylates with aliphatic anions, the catalysts of the invention are notable for reduced color formation on coating-film application. In the case of the imidazolium carboxylates with aliphatic anions, curing of the applied coating material at 60-110° C. for 30 minutes and subsequent storage at RT for 24 hours may be accompanied by lower pendulum hardnesses than, for example, with the inventive catalyst 1-ethyl-3-methyl-imidazolium benzoate. With the latter, the pendulum hardnesses are increasingly higher as the temperature climbs (see examples with Joncryl 507).

Particularly in the case of short curing under conditions of 15 minutes at 60° C. and 2 hours at room temperature, the 1-ethyl-3-methylimidazolium benzoate of the invention produces significantly better pendulum hardnesses than when noninventive catalysts are used.

All in all, imidazolium carboxylate catalysts of the invention such as 1-ethyl-3-methyl-imidazolium carboxylates with an aromatic carboxylate group, preferably in the form of benzoate, have proven to be more rapidly curing at low temperatures than compounds known from the literature, without any drop in the pendulum hardnesses at temperatures greater than 60° C. in combination with the polyacrylateol JONCRYL® 507. This is important for coating-film properties relevant in the art, such as dust-dry time, touchability, through-curing, polishability, blocking resistance, and stackability. Furthermore, the color behavior and solubility behavior are better than those of the aliphatic carboxylates of the imidazolium catalysts.

Polyisocyanates (A)

The monomeric isocyanates used for preparing the polyisocyanates may be aromatic, aliphatic or cycloaliphatic, preferably aliphatic or cycloaliphatic, referred to for short in this specification as (cyclo)aliphatic; aliphatic isocyanates are particularly preferred.

Aromatic isocyanates are those which comprise at least one aromatic ring system, in other words not only purely aromatic compounds but also araliphatic compounds. The aromatic isocyanates naturally display a higher reactivity, which can be increased further through the use of the catalysts of the invention.

Cycloaliphatic isocyanates are those which comprise at least one cycloaliphatic ring system.

Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also contemplated. Suitability therefor is possessed for example by triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates.

These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis-(isocyanatomethyl)cyclohexane or 2,4-, or 2,6-diisocyanato-1-methylcyclohexane, and also 3 (or 4), 8 (or 9)-bis(isocyanatomethyl)tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)-cyclohexane, isophorone diisocyanate, and 4,4'- or 2,4'-di(isocyanatocyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 90:10 (w/w), preferably of 70:30-90:10.

Dicyclohexylmethane 4,4'-diisocyanate may likewise be in the form of a mixture of the different cis and trans isomers.

For the present invention it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI) can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 100 ppm, more preferably less than 30 ppm, in particular less than 20 ppm, and especially less than 10 ppm. This can be measured using, for example, ASTM specification D4663-98. The amounts of total chlorine are, for example, below 1000 ppm, preferably below 800 ppm, and more preferably below 500 ppm (as determined by argentometric titration after hydrolysis).

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbamic esters, with those diisocyanates which have been obtained by phosgenating the corresponding amines.

The polyisocyanates (A) which can be formed by oligomerizing the monomeric isocyanates are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates (A) are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8. The polyisocyanates containing isocyanurate groups may to a minor extent also comprise urethane groups and/or allophanate groups, preferably with a bound-alcohol content of less than 2%, based on the polyisocyanate.

2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The polyisocyanates containing uretdione groups are obtained frequently in a mixture with other polyisocyanates, more particularly those specified under 1). Polyisocyanates containing uretdione groups typically have functionalities of 2 to 3.

For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 24% by weight and an average NCO functionality of 2.8 to 6.

4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of diisocyanate, such as of hexamethylene diisocyanate or of isophorone diisocyanate, with mono- or polyhydric alcohols (A). These polyisocyanates containing urethane and/or allophanate groups generally have an NCO content of 12% to 24% by weight and an average NCO functionality of 2.0 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as bismuth, cobalt, cesium, Zn(II) or Zr(IV) compounds, for example, in each case in the presence of monohydric, dihydric or polyhydric, preferably monohydric, alcohols.

These polyisocyanates containing urethane groups and/or allophanate groups occur frequently in hybrid forms with the polyisocyanates specified under 1).

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

12) The polyisocyanates 1)-11), preferably 1), 3), 4), and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane and/or allophanate groups is accomplished by reaction with monohydric, dihydric or polyhydric, preferably monohydric, alcohols, in the presence optionally of suitable catalysts. These polyisocyanates containing biuret or urethane/allophanate groups generally have an NCO content of 10% to 25% by weight and an average NCO functionality of 3 to 8.

13) Hydrophilically modified polyisocyanates, i.e., polyisocyanates which as well as the groups described under 1-12 also comprise groups which result formally from addition of molecules containing NCO-reactive groups and hydrophilizing groups to the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts.

14) Modified polyisocyanates for dual cure applications, i.e., polyisocyanates which as well as the groups described under 1-13 also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl(meth)acrylates and other hydroxy-vinyl compounds.

In one preferred embodiment of the present invention the polyisocyanate (A) is selected from the group consisting of isocyanurates, biurets, urethanes, and allophanates, preferably from the group consisting of isocyanurates, urethanes, and allophanates; more preferably it is a polyisocyanate containing isocyanurate groups.

In one particularly preferred embodiment the polyisocyanate (A) encompasses polyisocyanates comprising isocyanurate groups and obtained from 1,6-hexamethylene diisocyanate.

In one further particularly preferred embodiment the polyisocyanate (A) encompasses a mixture of polyisocyanates comprising isocyanurate groups, very preferably of 1,6-hexamethylene diisocyanate and of isophorone diisocyanate.

In one particularly preferred embodiment the polyisocyanate (A) is a mixture comprising low-viscosity polyisocyanates, preferably polyisocyanates comprising isocyanurate groups, having a viscosity of 200-1500 mPa*s, preferably of 400-1300, low-viscosity urethanes and/or allophanates having a viscosity of 200-1600 mPa*s, more particularly 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of 1000 $s^{-1}$.

The process for preparing the polyisocyanates may take place as described in WO 2008/68198, especially from page 20 line 21 to page 27 line 15 therein, which is hereby made part of the present specification by reference.

The reaction can be discontinued, for example, as described therein from page 31 line 19 to page 31 line 31, and working up may take place as described therein from page 31 line 33 to page 32 line 40, which in each case is hereby made part of the present specification by reference.

The reaction can alternatively be discontinued as described in WO 2005/087828 from page 11 line 12 to page 12 line 5, which is hereby made part of the present specification by reference.

In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate by distillation.

In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids.

These compounds are added neat or diluted in a suitable concentration as necessary to discontinue the reaction.

The binder (B) is at least one polymer type, for example, one to three, preferably one to two, and more preferably precisely one polymer type, which contains at least two isocyanate-reactive groups, preferably 2 to 15, more preferably 2 to 8, and very preferably 3 to 7.

The isocyanate-reactive groups are hydroxyl, primary or secondary amino groups, more particularly hydroxyl groups, among these preferably primary or secondary hydroxyl groups, more preferably primary hydroxyl groups.

The binders may be, for example, polyacrylate polyols, polyester polyols, polyether polyols, polyurethane polyols; polyurea polyols; polyester-polyacrylate polyols; polyester-polyurethane polyols; polyurethane-polyacrylate polyols, polyurethane-modified alkyd resins; fatty acid-modified polyester-polyurethane polyols, copolymers with allyl ethers, graft polymers of the stated groups of compounds having, for example, different glass transition temperatures, and also mixtures of the stated binders. Preference is given to polyacrylate polyols, polyester polyols, and polyurethane polyols.

Preferred OH numbers, measured in accordance with DIN 53240-2 (potentiometric), are 40-350 mg KOH/g resin solids for polyesters, preferably 80-180 mg KOH/g resin solids, and 15-250 mg KOH/g resin solids for polyacrylateols, preferably 80-160 mg KOH/g.

Preferred binders have an acid number, relative to the solids content, in accordance with DIN EN ISO 3682 (potentiometric) of less than 100 mg KOH/g, preferably less than 60, more preferably less than 30, and very preferably less than 10 mg KOH/g.

The acid groups here may be present freely or may have been neutralized with a base. Examples of bases are inorganic and organic bases, such as ammonium, alkali metal, and alkaline earth metal hydroxides, oxides, carbonates, hydrogencarbonates, and also ammonia or tertiary amines.

Examples of organic bases are amines, preferably tertiary amines, examples being trimethylamine, triethylamine, tributylamine, di-isopropylethylamine, benzyldimethylamine, triethanolamine, dimethylethanolamine, diethylethanolamine, methyldiethanolamine, ethyldiethanolamine, tripropanolamine, 1,4-diazabicyclo[2.2.2]octane (DABCO), 1,5-diazabicyclo[4.3.0]non-5-ene (DBN) and 1,8-diazabicyclo[5.4.0]undec-7-ene (DBU). Conceivable, albeit less preferably, is the use of primary or secondary amines as bases, examples being methylamine, ethylamine, n-propylamine, isopropylamine, n-butylamine, tert-butylamine, ethanolamine, propanolamine, benzylamine, aniline, dimethylamine, diethylamine, di-n-propylamine, diisopropylamine, di-n-butylamine, diethanolamine, dipropanolamine, 2-aminoethylethanolamine, dibenzylamine, pyrrolidone, piperidine, piperazin, and morpholine.

Preference is given to 1,4-diazabicyclo[2.2.2]octane (DABCO).

Particularly preferred binders (B) are polyacrylate polyols and polyesterols.

Polyacrylate polyols preferably have a molecular weight $M_n$ of at least 500, more preferably at least 1200 g/mol. The molecular weight $M_n$ may in principle have no upper limit, and may preferably be up to 50 000 g/mol, more preferably up to 20 000 g/mol, and very preferably up to 10 000 g/mol, and more particularly up to 5000 g/mol.

The hydroxy-functional monomers (see below) are used in the copolymerization in amounts such as to result in the abovementioned hydroxyl numbers on the part of the polymers, corresponding in general to a hydroxyl group content on the part of the polymers of 0.5% to 8%, preferably 1% to 5% by weight.

The copolymers in question are hydroxyl-containing copolymers of at least one hydroxyl-containing (meth)acrylate with at least one further polymerizable comonomer selected from the group consisting of (meth)acrylic acid alkyl esters, vinyl aromatics, α,β-unsaturated carboxylic acids, and other monomers.

Examples of suitable (meth)acrylic acid alkyl esters include $C_1$-$C_{20}$ alkyl(meth)acrylates, vinyl aromatics are those having up to 20 C atoms, α,β-unsaturated carboxylic acids also comprise their anhydrides, and other monomers are, for example, vinyl esters of carboxylic acids comprising up to 20 C atoms, ethylenically unsaturated nitriles, vinyl ethers of alcohols comprising 1 to 10 C atoms, and, less preferably, aliphatic hydrocarbons having 2 to 8 C atoms and 1 or 2 double bonds.

Preferred (meth)acrylic acid alkyl esters are those having a $C_1$-$C_{10}$ alkyl radical, such as methyl methacrylate, methyl acrylate, n-butyl acrylate, ethyl acrylate, and 2-ethylhexyl acrylate.

Also suitable in particular are mixtures of the (meth) acrylic acid alkyl esters.

Vinyl esters of carboxylic acids having 1 to 20 C atoms are, for example, vinyl laurate, vinyl stearate, vinyl propionate, and vinyl acetate.

α,β-Unsaturated carboxylic acids and their anhydrides may be, for example, acrylic acid, methacrylic acid, fumaric acid, crotonic acid, itaconic acid, maleic acid or maleic anhydride, preferably acrylic acid.

Hydroxy-functional monomers include monoesters of α,β-unsaturated carboxylic acids, such as acrylic acid, methacrylic acid (identified for short in this specification as "(meth)acrylic acid"), with diols or polyols which have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3- and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF with a molar weight between 162 and 4500, preferably 250 to 2000, poly-1,3-propanediol or polypropylene glycol with a molar weight between 134 and 2000, or polyethylene glycol with a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

Examples of suitable vinyl aromatic compounds include vinyltoluene, α-butylstyrene, α-methyl-styrene, 4-n-butyl-styrene, 4-n-decylstyrene, and—preferably—styrene.

Examples of nitriles are acrylonitrile and methacrylonitrile.

Examples of suitable vinyl ethers are vinyl methyl ether, vinyl isobutyl ether, vinyl hexyl ether, and vinyl octyl ether.

Suitable nonaromatic hydrocarbons having 2 to 8 C atoms and one or two olefinic double bonds include butadiene, isoprene, and also ethylene, propylene, and isobutylene.

It is also possible to employ N-vinylformamide, N-vinylpyrrolidone, and N-vinylcaprolactam, and also ethylenically unsaturated acids, especially carboxylic acids, acid anhydrides or acid amides, and also vinylimidazole. Comonomers containing epoxide groups, such as, for example, glycidyl acrylate or methacrylate, or monomers such as N-methoxymethylacrylamide or N-methoxymethyl-methacrylamide, can be used as well in minor amounts.

Preference is given to esters of acrylic acid and/or of methacrylic acid with 1 to 18, preferably 1 to 8, carbon atoms in the alcohol radical, such as, for example, methyl acrylate, ethyl acrylate, isopropyl acrylate, n-propyl acrylate, n-butyl acrylate, 2-ethylhexyl acrylate, and n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The hydroxyl-bearing monomers are used in the copolymerization of the hydroxyl-bearing (meth)acrylates in a mixture with other polymerizable monomers, preferably free-radically polymerizable monomers, preferably those composed to an extent of more than 50% by weight of $C_1$-$C_{20}$, preferably $C_1$ to $C_4$ alkyl(meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particular preference is given to the polymers composed—besides the hydroxyl-bearing monomers—to an extent of more than 60% by weight of $C_1$-$C_{10}$ alkyl(meth)acrylates, styrene and its derivatives, or mixtures thereof.

The polymers can be prepared by polymerization in accordance with customary techniques. The polymers are prepared preferably in an emulsion polymerization or in organic solution. Continuous or discontinuous polymerization techniques are possible. The discontinuous techniques include the batch technique and the feed technique, the latter being preferred. In the feed technique, the solvent is introduced, alone or together with part of the monomer mixture, and this initial charge is heated to the polymerization temperature; the polymerization, in the case of a monomer charge, is initiated free-radically, and the remaining monomer mixture, together with an initiator mixture, is metered in over the course of 1 to 10 hours, preferably 3 to 6 hours. Optionally there is subsequent reactivation, in order to carry through the polymerization to a conversion of at least 99%.

Examples of suitable solvents include aromatics, such as solvent naphtha, benzene, toluene, xylene, chlorobenzene, esters such as ethyl acetate, butyl acetate, methylglycol acetate, ethylglycol acetate, methoxypropyl acetate, ethers such as butylglycol, tetrahydrofuran, dioxane, ethylglycol ether, ketones such as acetone, methyl ethyl ketone, halogenated solvents such as methylene chloride or trichloromonofluoroethane.

Further binders (B) are, for example, polyester polyols, as are obtainable by condensing polycarboxylic acids, especially dicarboxylic acids, with polyols, especially diols. In order to ensure a polyester polyol functionality that is appropriate for the polymerization, use is also made in part of triols, tetrols, etc, and also triacids, etc.

Polyester polyols are known for example from Ullmanns Encyklopädie der technischen Chemie, 4th edition, volume 19, pp. 62 to 65. It is preferred to use polyester polyols which are obtained by reacting dihydric alcohols with dibasic carboxylic acids. In lieu of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, aromatic or heterocyclic and may if appropriate be substituted, by halogen atoms for example, and/or unsaturated. Examples thereof that may be mentioned include the following:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachloro-phthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$ alkyl esters for example, preferably methyl, ethyl or n-butyl esters, of the stated acids are employed. Preference is given to dicarboxylic acids of the general formula HOOC—$(CH_2)_y$—COOH, where y is a number from 1 to 20, preferably an even number from 2 to 20, and more preferably succinic acid, adipic acid, sebacic acid, and dodecanedicarboxylic acid.

Suitable polyhydric alcohols for preparing the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, Poly-THF having a molar mass of between 162 and 4500, preferably 250 to 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexane-dimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which optionally may have been alkoxylated as described above.

Preferred alcohols are those of the general formula HO—$(CH_2)_x$—OH, where x is a number from 1 to 20, preferably an even number from 2 to 20. Preferred are ethylene glycol, butane-1,4-diol, hexane-1,6-diol, octane-1,8-diol and dodecane-1,12-diol. Additionally preferred is neopentyl glycol.

Also suitable, furthermore, are polycarbonate diols of the kind obtainable, for example, by reacting phosgene with an excess of the low molecular mass alcohols specified as synthesis components for the polyester polyols.

Also suitable are lactone-based polyester diols, which are homopolymers or copolymers of lactones, preferably hydroxy-terminated adducts of lactones with suitable difunctional starter molecules. Suitable lactones are preferably those which derive from compounds of the general formula HO—$(CH_2)_z$—COOH, where z is a number from 1 to 20 and where one H atom of a methylene unit may also have been substituted by a $C_1$ to $C_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components include the low molecular mass dihydric alcohols specified above as a synthesis component for the polyester polyols. The corresponding polymers of ε-caprolactone are particularly preferred. Lower polyester diols or polyether diols as well can be used as starters for preparing the lactone polymers. In lieu of the polymers of lactones it is also possible to use the corresponding, chemically equivalent polycondensates of the hydroxycarboxylic acids corresponding to the lactones.

In polyurethane coating materials, molar masses $M_n$ of the polyesters of 800-4000 g/mol are typical, the polyesters used here not being limited to these.

Additionally suitable as binders are polyetherols, which are prepared by addition reaction of ethylene oxide, propylene oxide and/or butylene oxide, preferably ethylene oxide and/or propylene oxide, and more preferably ethylene oxide, with H-active components. Polycondensates of butanediol are also suitable. In polyurethane coating materials, molar masses of the polyethers of 500-2000 g/mol are typical, the polyethers used here not being limited to these.

The polymers may be replaced at least in part by what are known as reactive diluents. These may be blocked secondary or primary amines (aldimines and ketimines) or compounds having sterically hindered and/or electron-poor secondary amino groups, examples being aspartic esters in accordance with EP 403921 or WO 2007/39133.

(C) Imidazolium Salt

Compound (C) is at least one, for example, one to three, preferably one to two, and more preferably precisely one imidazolium salt of the formula I

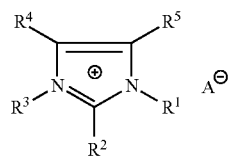

in which $R^1$ and $R^3$ independently of one another are an organic radical having 1 to 20 C atoms, $R^2$, $R^4$ and $R^5$ are independently of one another an H atom or an organic radical having up to 20 C atoms, and $A^-$ is an anion.

$R^1$ and $R^3$ are preferably independently of one another an organic radical having 1 to 10 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^1$ and $R^3$ are a hydrocarbon radical which apart from carbon and hydrogen may further comprise at most hydroxyl groups, ether groups, ester groups or carbonyl groups.

$R^1$ and $R^3$ with particular preference are independently of one another a hydrocarbon radical having 1 to 20 C atoms, more particularly having 1 to 10 C atoms, which comprises no other heteroatoms, e.g., oxygen or nitrogen. The hydrocarbon radical may be aliphatic (in which case unsaturated aliphatic groups are also included) or aromatic, or may comprise both aromatic and aliphatic groups. Preferably $R^1$ and $R^3$ are an aliphatic hydrocarbon radical.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^1$ and $R^3$ independently of one another are a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. As an alkyl group, a $C_1$ to $C_6$ alkyl group represents one particular embodiment, and in a very particular embodiment the alkyl group is a $C_1$ to $C_4$ alkyl group.

With very particular preference $R^1$ and $R^3$ are independently of one another a methyl, ethyl, n-propyl, isopropyl, n-butyl, sec-butyl or tert-butyl group, with the methyl, ethyl n-propyl, and n-butyl groups having particular importance.

$R^1$ is preferably a $C_1$ to $C_6$, more particularly a $C_1$ to $C_4$ alkyl group.

$R^3$ is preferably a methyl group.

In one preferred embodiment $R^2$ is an H atom.

In another preferred embodiment $R^2$ is an alkyl group, as for example a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. For the radical $R^2$, a $C_1$ to $C_6$ alkyl group represents one particular embodiment, and in a very particular embodiment the alkyl group is a $C_1$ to $C_4$ alkyl group.

$R^4$ and $R^5$ are preferably independently of one another a hydrogen atom or an organic radical having 1 to 10 C atoms. The organic radical may also comprise further heteroatoms, more particularly oxygen atoms, nitrogen, sulfur or phosphorus atoms, or functional groups, as for example hydroxyl groups, ether groups, ester groups, or carbonyl groups.

More particularly $R^4$ and $R^5$ are a hydrocarbon radical which apart from carbon and hydrogen may further comprise at most hydroxyl groups, ether groups, ester groups or carbonyl groups.

$R^4$ and $R^5$ with particular preference are independently of one another a hydrocarbon radical having 1 to 20 C atoms, more particularly having 1 to 10 C atoms, which comprises no other heteroatoms, e.g., oxygen or nitrogen. The hydrocarbon radical may be aliphatic (in which case unsaturated aliphatic groups are also included) or aromatic, or may comprise both aromatic and aliphatic groups. Preferably $R^1$ and $R^2$ are an aliphatic hydrocarbon radical.

Examples of hydrocarbon radicals include the phenyl group, benzyl group, a benzyl group or phenyl group substituted by one or more $C_1$ to $C_4$ alkyl groups, or the mesityl group, alkyl groups and alkenyl groups, more particularly the alkyl group.

With very particular preference $R^4$ and $R^5$ are a hydrogen atom or a $C_1$ to $C_{10}$ alkyl group. A particularly preferred alkyl group is a $C_1$ to $C_6$ alkyl group, and in one particular embodiment the alkyl group is a $C_1$ to $C_4$ alkyl group.

With very particular preference $R^4$ and $R^5$ are independently of one another a methyl, ethyl, n-propyl, isopropyl, n-butyl, sec-butyl or tert-butyl group, with the methyl, ethyl n-propyl, and n-butyl groups having particular importance.

In one particular embodiment $R^4$ and $R^5$ are each H atoms.

In another particular embodiment $R^2$, $R^4$, and $R^5$ are each H atoms.

Examples of imidazolium ions are 1,2-dimethyl-3-propylimidazolium, 1-ethyl-2,3-dimethylimidazolium, 1-butyl-2,3-dimethylimidazolium, 1-benzyl-3-methylimidazolium, 3-ethyl-1-methyl-imidazolium, 1-propyl-3-methylimidazolium, 3-n-butyl-1-methylimidazolium, 1-hexyl-3-methylimidazolium, 1-methyl-3-octylimidazolium, 1-decyl-3-methylimidazolium, 1-dodecyl-3-methyl-imidazolium, 1,3-diethylimidazolium, 1,3-diisopropylimidazolium, 1,3-di-n-butylimidazolium, 1,3-dihexylimidazolium, and 1,2,3,4,5-pentamethylimidazolium.

Preferred imidazolium ions are 3-ethyl-1-methylimidazolium, 1,3-diethylimidazolium, 1,3-dihexylimidazolium, and 1,3-di-n-butylimidazolium.

In one preferred variant $R^2$, $R^4$ and $R^5$ are hydrogen.

In another preferred variant $R^1$ and $R^3$ are the same.

In one preferred embodiment at least one of the two radicals $R^1$ and $R^3$ has at least 4 carbon atoms, and more preferably at least one of these radicals is n-butyl, hexyl or 2-ethylhexyl. This produces increased solubility in solvents and in solventborne coating compositions.

In another preferred embodiment $R^1$ and $R^3$ are the same and are each more preferably methyl, ethyl or n-butyl. This generally produces a lower toxicity and/or ecotoxicity on the part of the compounds.

The anion $A^-$ in formula I is an aromatic or heteroaromatic carboxylate anion, preferably an aromatic carboxylate anion.

Examples of anions $A^-$ are the anions of aromatic carboxylic acids such as benzoic acid, 2-, 3- or 4-methylbenzoic acid, 3,5-dimethylbenzoic acid, 2-, 3- or 4-chlorobenzoic acid, 2,3-, 2,4-, 2,5- or 3,4-dichlorobenzoic acid, 2-, 3- or 4-cyanobenzoic acid, 2-, 3- or 4-methoxybenzoic acid, 2-, 3- or 4-nitrobenzoic acid, 2,4-dinitrobenzoic acid, salicylic acid, 3-hydroxy-4-methylbenzoic acid, acetylsalicylic acid, 2-, 3- or 4-aminobenzoic acid, 4-dimethylaminobenzoic acid, 4-diethyl-aminobenzoic acid, phthalic acid, isophthalic acid, terephthalic acid, naphthalene-1-carboxylic acid, naphthalene-2-carboxylic acid, anthracene-9-carboxylic acid, pyridine-2-, -3- or -4-carboxylic acid, indole-5-carboxylic acid, and nicotinic acid.

The anion of benzoic acid is preferred.

The synthesis of such imidazolium ions with carboxylate anions as counterion is described for example in WO 2009/040242. The synthesis of the symmetrical imidazolium salts is described for example in WO 2009/074535 A2.

Working up may take place for example as described in WO 2009/027250 A2.

Preferred examples that may be given of imidazolium catalysts are those in which $R^2=R^4=R^5=H$ and $R^1$ and $R^3$ are n-alkyl radicals with chain lengths in accordance with the table below, and the anion is an aromatic or heteroaromatic, preferably aromatic, carboxylate anion:

| Number of carbon atoms in $R^1$ | Number of carbon atoms in $R^3$ |
|---|---|
| 1 | 1 |
| 2 | 1 |
| 2 | 2 |
| 3 | 1 |
| 4 | 1 |
| 4 | 2 |
| 4 | 4 |
| 6 | 1 |
| 8 | 1 |
| 10 | 1 |
| 12 | 1 |
| 16 | 1 |
| 18 | 1 |

Mention may also be made of corresponding compounds with an $R^2$ as n-alkyl radical with chain length as per the table below:

| Number of carbon atoms in $R^1$ | Number of carbon atoms in $R^2$ | Number of carbon atoms in $R^3$ |
|---|---|---|
| 1 | 1 | 1 |
| 2 | 1 | 1 |
| 2 | 2 | 2 |
| 4 | 1 | 1 |

The following may also be mentioned: 1-methyl-3-vinylimidazolium carboxylate, more particularly 1-methyl-3-vinylimidazolium benzoate; 1-benzyl-3-methylimidazolium carboxylate, more particularly 1-benzyl-3-methylimidazolium benzoate.

It is an advantage of the compounds (C) if at 1 bar they have a melting point of not more than 60° C., preferably not more than 40° C., and more preferably not more than 20° C.

In coating-material applications with aliphatic polyisocyanates, there is frequently a preference for components having a low intrinsic color (e.g., clearcoat). It is therefore an advantage of the compounds (C) if their intrinsic color, optionally following purification steps, is as low as possible. In one preferred form, this corresponds to iodine color numbers (DIN 6162) of less than 20, more preferably less than 15, very preferably less than 10, in particular less than 5, and especially less than 1.

Furthermore, optionally, there may be a solvent or solvent mixture (D) present.

Solvents which can be used are those which preferably have no groups that are reactive toward isocyanate groups or capped isocyanate groups.

Possible solvents (D) are, for example, esters, ethers, ketones, aromatic solvents, alkoxylated alkanoic acid alkyl esters, carbonates, or mixtures of the solvents.

Esters are, for example, n-butyl acetate, ethyl acetate, 1-methoxyprop-2-yl acetate, and 2-methoxyethyl acetate.

Ethers are, for example, THF, dioxane, and also the dimethyl, diethyl or di-n-butyl ethers of ethylene glycol, diethylene glycol, triethylene glycol, propylene glycol, dipropylene glycol or tripropylene glycol.

Ketones are, for example, acetone, ethyl methyl ketone, diethyl ketone, isobutyl methyl ketone, methyl amyl ketone, and tert-butyl methyl ketone. Its flash point makes acetone less preferable.

Preferred as aromatic hydrocarbon, in particular, are xylene and toluene, especially xylene. Mixtures of aromatics are in principle also suitable, but less preferred, since in conjunction with the stated ionic liquids as catalysts they can lead to the development of color in the through-cured material. Examples thereof are the SOLVESSO® products from ExxonMobil Chemical, especially SOLVESSO® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the SHELLSOL® products from Shell, CAROMAX® (e.g., CAROMAX® 18) from Petrochem Carless, and Hydrosol from DHC (e.g., as Hydrosol® A 170).

Together with ionic liquids as catalysts, SOLVESSO® products are less suitable if they lead to discoloration in the coating.

Further possible solvents are butylglycol diacetate (Merck Schuchardt OHG), butylglycol acetate (Merck Schuchardt OHG), dipropylene glycol dimethyl ether (PROGLYDE® DMM, Sigma-Aldrich, Germany), 3-methoxy-n-butyl acetate (BUTOXYL®, F.B. Silbermann GmbH), dipropylene glycol n-butyl ether (BDG, DOWANOL® DPnB, Dow Chemical Company), and propylene carbonate.

Alcohols can also be used as solvents, but ought to be kept low in their amount, particularly if they are monofunctional alcohols. Alcohols are less preferable.

Preferred solvents are n-butyl acetate, ethyl acetate, 1-methoxyprop-2-yl acetate, 2-methoxyethyl acetate, xylene, toluene, and mixtures thereof.

Solvents which can be used for the imidazolium salts are preferably those in which the imidazolium salts dissolve at 23° C. to more than 1% by weight, preferably to more than 10% by weight. In the case of less-soluble imidazolium salts and those solid at room temperature, particularly suitable solvents are ketones such as acetone and ethyl methyl ketone. Acetone is less preferable on account of its flash point.

In one preferred variant the imidazolium salts are dissolved without the use of solvents, directly, in one of the components (polyol or isocyanate-containing component), preferably in the polyol.

Furthermore it is possible optionally, although less preferably, for there to be at least one further urethanization catalyst (E) present. This may be, for example, an amine (E1) or an organometallic compound (E2).

Amines (E1) are, for example, tertiary aliphatic, cycloaliphatic or aromatic amines. Examples thereof are triethylamine, tri-n-butylamine, N-methylmorpholine, N-methylpiperidine, pyrrolidine, quinuclidine, preferably 1,4-diazabicyclo[2.2.2]octane.

Examples of suitable organometallic compounds (E2) include tin compounds, as for example tin(II) salts of organic carboxylic acids, e.g., tin(II) diacetate, tin(II) dioctoate, tin(II) bis(ethylhexanoate), and tin(II) dilaurate, and the toxicologically objectionable dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate, especially dibutyltin dilaurate.

Other and more strongly preferred Lewis-acidic organometallic compounds are zinc salts, examples being zinc(II) diacetate and zinc(II) dioctoate.

Tin-free and zinc-free alternatives used preferably include organic metal salts of bismuth, zirconium, titanium, aluminum, cerium, cesium, iron, manganese, nickel, and cobalt.

These are, for example, zirconium tetraacetylacetonate (e.g., K-KAT® 4205 from King Industries); zirconium dionates (e.g. K-KAT® XC-9213; XC-A 209 and XC-6212 from King Industries; bismuth compounds, especially tricarboxylates (e.g., K-KAT® 348, XC-B221; XC-C227, and XC 8203 from King Industries); aluminum dionate (e.g., K-KAT® 5218 from King Industries). Tin-free and zinc-free catalysts are otherwise also available, for example, under the trade name Borchi® Kat from Borchers, TK from Goldschmidt, or BICAT® from Shepherd, Lausanne.

Bismuth catalysts are more particularly bismuth carboxylates, especially bismuth octoates, ethylhexanoates, neodecanoates, or pivalates; examples are K-KAT 348 and XK-601 from King Industries, TIB KAT 716, 716LA, 716XLA, 718, 720, and 789 from TIB Chemicals, and those from Shepherd Lausanne, and also catalyst mixtures of, for example, bismuth organyls and zinc organyls.

Further metal catalysts are described by Blank et al. in Progress in Organic Coatings, 1999, Vol. 35, pages 19-29.

These catalysts are suitable accordingly for solventborne, waterborne and/or blocked systems.

Molybdenum, tungsten, and vanadium catalysts are described more particularly for the conversion of blocked polyisocyanates in WO 2004/076519 and WO 2004/076520.

Preferred Lewis-acidic organometallic compounds are dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, and bismuth compounds, on toxicological grounds, especially the non-tin-containing compounds.

Further, typical coatings components and/or additives (F) used may be the following, for example: stabilizers, UV stabilizers such as UV absorbers and suitable free-radical scavengers (especially HALS compounds, hindered amine light stabilizers), activators (accelerators), drying agents, fillers, pigments, dyes, antistatic agents, flame retardants, thickeners, thixotropic agents, surface-active agents, viscosity modifiers, plasticizers or chelating agents. UV stabilizers are preferred.

Stabilizers are at least one compound having a stabilizing action, the term "stabilizing" identifying the capacity to reduce the development of a color number and/or of the viscosity of component A in the course of storage over a certain period of time as compared with those corresponding mixtures which comprise no compounds having a stabilizing action.

The stabilization may relate either to component (A) alone, or to premixes of components (A) and (C), optionally with addition of further components. In one particular embodiment, this relates to the storage of one of these components prior to the actual application of the coating material.

These compounds having a stabilizing action are preferably selected from the group consisting of primary antioxidants (free-radical scavengers), secondary antioxidants (compounds which prevent free radicals forming, particularly by scavenging and/or decomposing peroxides), and acidic stabilizers (Bronsted acids).

The primary antioxidants are preferably sterically hindered phenols. Such sterically hindered phenols are described, for example, in WO 2008/116894, preferably the compounds described therein at page 14 line 10 to page 16 line 10, which is hereby made part of the present disclosure content by reference.

The secondary antioxidants are preferably selected from the group consisting of phosphites, phosphonites, phosphonates, and thioethers.

Phosphites are compounds of the type $P(OR^a)(OR^b)(OR^c)$ where $R^a$, $R^b$, and $R^c$ are identical or different aliphatic, cycloaliphatic or aromatic radicals, which optionally may also form cyclic or spiro structures, so that two of the radicals $R^a$, $R^b$ and $R^c$ are joined to one another and form a ring system together with the phosphorus atom.

In one embodiment $R^a$, $R^b$ and $R^c$ independently of one another are a $C_1$ to $C_{18}$ alkyl group, preferably a $C_1$ to $C_{16}$, more preferably a $C_1$ to $C_{14}$, very preferably $C_1$ to $C_{12}$, and more particularly $C_1$ to $C_{10}$ alkyl group. In particular, $R^a$, $R^b$ and $R^c$ are in each case identical and are selected from the group consisting of methyl, ethyl, n-butyl, n-hexyl, and n-octyl.

In one preferred embodiment the radicals $R^a$, $R^b$ and $R^c$ are optionally substituted aromatic radicals having 6 to 12 carbon atoms.

$R^a$, $R^b$ and $R^c$ are preferably selected from the group consisting of phenyl, o-, m- or p-tolyl, o-, m- or p-chlorophenyl, 2,6-dimethylphenyl, 2,3,6-trimethylphenyl, and naphthyl.

Further preferred are phosphites of the formula

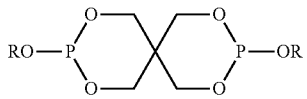

where R is preferably an aryl group which is substituted in positions 2, 4, and 6 as follows:
position 2: tert-butyl, tert-amyl
position 4: hydrogen, alkyl, tert-butyl or tert-amyl, and
position 6: hydrogen, alkyl, tert-butyl or tert-amyl,
with the proviso that at least one of the substituents in positions 4 and 6 is other than hydrogen.

Preferred examples of such compounds are as follows:
"9228=DOVERPHOS® S-9228=3,9-bis(2,4-di-tert-butylphenoxy)-2,4,8,10-tetraoxa-3,9-di-phosphaspiro [5.5]undecane (CAS=154862-43-8)
3,9-bis(2,6-di-tert-butyl-4-methylphenoxy)-2,4, 8,10-tetraoxa-3,9-diphosphaspiro(5.5)un-decane (CAS 80693-00-1)=ADK Stab PEP-3
IRGAFOS® 126=bis-(2,4-di-tert-butylphenyl)pentaerythritol diphosphite (CAS 26741-53-7)
WESTON® 618=DOVERPHOS® S 680=dioctadecyl pentaerythritol diphosphite
(CAS 3806-34-6)
ADK Stab PEP 36 (CAS 80693-00-1)
bis(2,4-di-tert-butylphenyl)pentaerythrol diphosphite;
3,9-bis(2,4-bis-(1,1-dimethylethyl)-phenoxy)-2,4,8,10-tetraoxa-3,9-diphosphaspiro[5.5]undecane=ADK Stab PEP 24=DOVERPHOS® S 9432=WESTON® 626.

Preferred phosphonites are described in WO 2008/116894, particularly from page 11 line 8 to page 14 line 8 therein, which is hereby made part of the present disclosure content by reference.

Preferred phosphonates are described in WO 2008/116895, particularly from page 10 line 38 to page 12 line 41 therein, which is hereby made part of the present disclosure content by reference.

Preferred thioethers are described in WO 2008/116893, particularly from page 11 line 1 to page 15 line 37 therein, which is hereby made part of the present disclosure content by reference.

The acidic stabilizers are Bronsted acids, as described in WO 2008/116894, particularly from page 17 line 34 to page 18 line 23 therein, which is hereby made part of the present disclosure content by reference.

Drying agents or dewatering agents are compounds which are able to react preferentially with water. Examples of suitable drying agents are para-toluenesulfonyl isocyanate (e.g., additive TI from Borchers), orthoester (e.g., additive OF from Borchers) or oxazolidines, examples being the Incozol products from ICL (Industrial Copolymers), or Basonat SCI from BASF.

Toluenesulfonyl isocyanate is preferred.

The presence of drying agent may be of advantage in particular in a polyisocyanate component or in a component comprising imidazolium catalysts.

Suitable UV absorbers encompass oxanilides, triazines and benzotriazole (the latter available, for example as, TINUVIN® products from BASF SE) and benzophenones (e.g., CHIMASSORB® 81 from BASF SE). Preference is given, for example, to 95% benzenepropanoic acid, 3-(2H-benzotriazole-2-yl)-5-(1,1-dimethylethyl)-4-hydroxy-, C7-9 branched and linear alkyl esters; 5% 1-methoxy-2-propyl acetate (e.g., TINUVIN® 386) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g., TINUVIN® 1130), in each case products, for example, of BASF SE. DL-alpha-tocopherol, tocopherol, cinnamic acid derivatives, and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g., bis(2,2,6,6-tetramethyl-4-piperidyl) sebacate. They are obtainable, for example, as TINUVIN® products and CHIMASSORB® products from BASF SE. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxy-phenyl]methyl]butylmalonate (e.g., TINUVIN® 144 from BASF SE); a mixture of bis(1,2,2,6,6-pentamethyl-4-piperidinyl)sebacate and methyl(1,2,2,6,6-pentamethyl-4-piperidinyl) sebacate (e.g., TINUVIN® 292 from BASF SE); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxide and octane (e.g., TINUVIN® 123 from BASF SE). UV stabilizers are used typically in amounts of 0.1% to 5.0% by weight, based on the solid components present in the preparation.

Suitable thickeners include, in addition to free-radically (co)polymerized (co)polymers, typical organic and inorganic thickeners such as hydroxymethylcellulose or bentonite.

Chelating agents which can be used include, for example, ethylenediamineacetic acid and salts thereof and also β-diketones.

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense encompass any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer coating system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine, and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blanc fixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 µm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers encompass silicates, examples being silicates obtainable by hydrolysis of silicon tetrachloride, such as Aerosil® from Degussa, siliceous earth, talc, aluminum silicates, magnesium silicates, calcium carbonates, etc.

The constitution of the 2K coating compositions of the invention is, for example, as follows:

(A) 5% to 60%, preferably 10% to 50%, more preferably 10-30% by weight, (B) 10% to 80%, preferably 20% to 60% by weight, (C) 10 to 20 000 ppm by weight, preferably 50 to 10 000, more preferably 300 to 4000, (D) 0% to 80%, preferably 0-70%, more preferably 5% to 60% by weight, (E) 0-10 000 ppm by weight, preferably 10 to 5000 ppm by weight, preferably 20 to 1000 ppm by weight (F) 0-5% of components and/or additives.

with the proviso that the sum of these components, but without including that of the fillers, colorants, and pigments, is always 100% by weight.

In the coating compositions, polyisocyanate composition (A) and binder (B) are mixed with one another in a molar ratio of isocyanate groups to isocyanate-reactive groups of 0.5:1 to 2:1, more particularly 0.8:1 to 1.2:1, and especially 0.9:1 to 1.1:1, the incorporation, by mixing, of further, typical coatings constituents being a further, optional possibility, and the resulting mixture is applied to the substrate.

Here there may optionally be a premixing, and optionally storage of a polyisocyanate and/or of a polyol component, e.g.

(A) at least one polyisocyanate obtainable by reacting at least one monomeric isocyanate, (C) at least one imidazolium salt according to any one of claims 1 and 5 to 8, (D) optionally at least one solvent, (E) optionally at least one urethanization catalyst other than (C), and (F) optionally other, typical application components and/or additives.

This premix is then mixed with the polyol component (B) and also, optionally, with one or more of components (D) to (F), shortly before application to the substrate.

Or alternatively and preferably:

A premix is prepared, comprising the following components:

(B) at least one compound which has at least two isocyanate-reactive groups, a number-average molecular weight Mn of at least 1000 g/mol, and an OH number of 40 to 350 mg KOH/g, (C) at least one imidazolium salt according to any of claims 1 and 5 to 8, (D) optionally at least one solvent, (E) optionally at least one urethanization catalyst other than (C), and (F) optionally other, typical application components and/or additives.

This premix is then mixed with the polyisocyanate component (A), and also, optionally, with one or more of components (D) to (F), shortly before application to the substrate, and thus forms the coating composition.

Mixing into the polyol component is preferred, since less color is developed than when mixing takes place into the polyisocyanate component.

"Shortly before application" here means that premix and missing component are mixed with one another in a time period prior to application to the substrate within which trouble-free processability is ensured—that is, the coating composition continues to be fluid and amenable to application, the film appearance and the film properties are not relevantly impaired (processing life see ISO 9514:2005). The period of time is of course less than the gel time (see examples). A measure that can be taken for the processing life is, for example, the time in which there is a doubling in the flow time of the mixture, from 20 to 40 seconds, for example, in the DIN 4 cup (DIN 53211). In the case of manual application, for example, a processing life of up to 3 hours is frequently required. In the case of purely industrial operations, the components may in an extreme case be mixed and then sprayed directly. In the event of plant standstill, there must, where necessary, be sufficient time to ensure that the waiting time does not adversely affect processing, film appearance or coating-film properties.

Subsequently the coating-material mixture is cured at ambient temperature to 150° C.

The coating mixture is preferably cured at 20 to 110° C., preferably 20-80° C., more preferably from 20 to 60° C., for refinish applications or large objects which are difficult to place into an oven, for example. Rapid curing at low temperatures is important, since in that case the film surface dries to a dust-free state within a shorter time and hence exhibits fewer film defects as a result of dirt pickup (e.g., dust, insects). Moreover, the storage time until further processing is shortened. The components can be taken hold of or stacked at an earlier stage. Alternatively, it is possible to carry out curing at lower temperatures and thus save on energy.

By "curing" in the context of the present invention is meant the generation of a tack-free coating on a substrate, by the heating of the coating composition that has been applied to the substrate, at the temperature indicated above, for at least until at least the desired tack-free state has been reached.

A coating composition in the context of the present specification is a mixture of at least components (A) and (B), which is intended for coating at least one substrate for the purpose of forming a film and, after curing, a tack-free coating.

The substrates are coated by typical methods known to the skilled worker, with at least one coating composition being applied in the desired thickness to the substrate to be coated, and the volatile constituents of the coating composition that are optionally present being removed, optionally with heating. This operation may if desired be repeated one or more times. Application to the substrate may take place in a known way, as for example by spraying, troweling, knife-coating, brushing, rolling, roller coating, flow coating, laminating, injection backmolding or coextruding.

The thickness of a film of this kind for curing may be from 0.1 µm up to several mm (e.g., (structural) adhesives, poured floors, primers, troweling fillers). Preference is given to 5 to 200 µm, more preferably from 5 to 60 µm, especially preferably 20-50 µm (based on the coating in the state in which the solvent has been removed from the system).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance, and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood block flooring, can coating, and coil coating, for floor coverings, such as in parking levels or in hospitals, and in automotive finishes, as OEM and refinish.

Coating compositions of this kind are used preferably at temperatures between ambient temperature to 80° C., preferably to 60° C., more preferably to 40° C. The articles in question are preferably those which cannot be cured at high temperatures, such as large machines, aircraft, large-capacity vehicles, and refinish applications, or OEM in the case of plastic components and components for exterior installation—lower than 110° C.

In one preferred variant the coating, when using an imidazolium carboxylate with an aromatic carboxylate, preferably benzoate, for catalysis is polishable after flashing at room temperature for 10-30 minutes, curing at 60° C. for 15 to 25 minutes, and subsequent storage at room temperature for 2 to 4 hours.

Also conceivable is the application of the imidazolium carboxylates with aromatic carboxylates in 100% systems such as powder coatings, adhesives, poured floors, primers or troweling fillers, for example.

The coating compositions of the invention, in line with the terminology of the application, are identified and used in particular as clearcoat, basecoat, and topcoat materials, primers, primer-surfacers, middle coat, coating, wear coat, film, material, and so on.

The present invention further provides for the use of imidazolium compounds of formula (I) as catalysts for the curing of mixtures comprising at least one polyisocyanate and at least one compound which contains isocyanate-reactive groups.

EXAMPLES

Test Methods:

Gelling time: time at 23° C. within which a mixture of a polyol component and polyisocyanate component in a test tube at 23° C. solidifies from an internal diameter of around approximately 1.8 cm and a height of around 11 cm. As soon as the mixture has built up a solid structure by chemical reaction, a wire immersed in the material and in oscillation lifts the test tube and shuts off the recording of time. This is a simple mechanical determination.

Processing life: time taken for the viscosity of a mixture of polyol component and polyisocyanate component to double.

Film thicknesses for all of the coating materials were 35-45 micrometers (based on the dry paint film).

The pendulum hardness was tested by the method of König in line with DIN 53 157, frequently with curing at the stated temperature for 30 minutes and storage for 24 hours at "room temperature"—that is, presently, 23+/−2° C., 50+/− 5% atmospheric humidity (standard conditions 23/50). Room-temperature storage for 7 days is followed by a 15-hour aftercure at 60° C. This is intended to simulate curing after very long storage at RT.

Raw Materials:

BASONAT® HI 100: 1,6-Hexamethylene diisocyanate-based oligomeric isocyanurate from BASF SE, NCO content 22.0%, viscosity about 2800 mPa*s.

BASONAT® LR 9046: 1,6-Hexamethylene diisocyanate-based oligomeric isocyanurate from BASF SE, NCO content 23.0%, viscosity about 1200 mPa*s. On account of the low viscosity as compared with standard BASONAT® HI 100, this isocyanurate is more suitable for high-solids applications with low solvent content.

JONCRYL® 507: acrylate-based polyol from BASF SE with OH number of 140 mg KOH/g (80% in butyl acetate). This polyol is highly suitable for high-solids applications with low solvent content.

JONCRYL® S028: acrylate-based polyol from BASF SE with OH number of 140 mg KOH/g (72% in butyl acetate)

JONCRYL® 902: acrylate-based polyol from BASF SE with OH number of 112 mg KOH/g (75% in butyl acetate)

DBTL: Dibutyltin dilaurate from Merck

BORCHI® Kat 24: Bismuth trisethylhexanoate from OMG Borchers GmbH (not inventive).

TEDA: Triethylenediamine, DABCO: 1,4-diazabicyclo[2.2.2]octane from Sigma Aldrich EMIMBz: 1-Ethyl-3-methylimidazolium benzoate. Basionics KAT 1 from BASF SE (inventive)

EMIMAc: 1-Ethyl-3-methylimidazolium acetate. Basionics BC01 from BASF SE (not inventive)

EEIMAc: 1-Ethyl-3-ethylimidazolium acetate. Basionics BC03 from BASF SE (not inventive)

EEIMOct: 1-Ethyl-3-ethylimidazoliumoctanoate from BASF SE (not inventive)

EMIMEtHex: 1-Ethyl-3-methylimidazolium ethylhexanoate from BASF SE (not inventive)

EMIMPiv: 1-Ethyl-3-methylimidazolium pivalate from BASF SE (not inventive)

PrPrIMAc: 1-Isopropyl-3-isopropylimidazolium acetate from BASF SE (not inventive).

The product is solid and had to be used in solution in acetone instead of in butyl acetate. Particulate solids formed in the coating material.

PrPrIMOct: 1-Isopropyl-3-isopropylimidazolium octanoate from BASF SE (not inventive).

sBusBuIMAc: 1-sec-Butyl-3-sec-butylimidazolium acetate from BASF SE (not inventive).

tButBuIMAc: 1-tert-Butyl-3-tert-butylimidazolium acetate from BASF SE (not inventive).

Me5IMAc: 1,2,3,4,5-Pentamethylimidazolium acetate from BASF SE (not inventive).

EMMIMAc: 1-Ethyl-2,3-dimethylimidazolium acetate from BASF SE (not inventive).

MMMIMAc: 1,2,3-Trimethylimidazolium acetate from BASF SE (not inventive).

Method procedure 1: JONCRYL® 507 was mixed with BASONAT® HI 100 in a stoichiometric ratio and with catalyst, and the mixture was adjusted with butyl acetate to an application viscosity of 20 seconds' flow time in the DIN4 cup. The experiments are conducted with mixtures of this kind.

For comparability of experiments with catalysts differing in reactivity, the procedure adopted is as follows:

The mixture of the polyol component and isocyanate component with various catalysts is adjusted to the same gelling time. The quantities of catalyst here are different, but the processing window for the user is comparable. A variant is to set a comparable processing life (doubling in viscosity—see above). This is half as great in terms of order of magnitude as the gelling time. With proper processing, the development of hardness is readily assessable.

Example Series 1: Aggregate State, Color, Solubility

EMIMBz has significant advantages over numerous non-inventive imidazolium carboxylates with aliphatic carboxylates, since it is liquid and therefore can be incorporated more effectively. It is more soluble in solvents, polyols, and polyisocyanates than are many of its aliphatic analogs.

TABLE 1

Aggregate state, solubility in polyol (JONCRYL ® 507); polyisocyanate (BASONAT ® HI 100); butyl acetate solvent (preferred), acetone (OK = soluble; NOK = not soluble)

| Product | | Aggregate state | JONCRYL ® 507 | BASONAT ® HI 100 | 10% in acetone |
|---|---|---|---|---|---|
| EMIMBz | Ex. | liquid | >10% | yellow, hazy | OK |
| EMIMAc | Comp. | liquid | | <2%, red streaks | NOK |
| EEIMAc | Comp. | liquid | 1% particles | <2%, red streaks | OK |
| EEIMOct | Comp. | liquid | >1% | <2%, red streaks | OK |
| EMIMEtHex | Comp. | liquid | | yellow, hazy | |
| EMIMPiv | Comp. | solid | | | |
| PrPrIMAc | Comp. | solid | >5% | <5%, orange-brown solid | NOK |
| PrPrIMOct | Comp. | solid | >1% | <1% white solid | OK |
| sBusBuIMAc | Comp. | solid | <1% in 1 h | <2%, white solid | OK |
| tButBuIMAc | Comp. | solid | | | OK |
| Me5IMAc | Comp. | solid | | | NOK |
| EMMIMAc | Comp. | solid | <5% | <5% white solid | |
| MMMIMAc | Comp. | solid | <5% | <5% white solid | NOK |

The solubilities are reported at room temperature (RT, 23° C.). The values were defined in particular limits, and may possibly be higher than as reported. The relevant comparative examples, therefore, are those with less than a certain percentage. PrPrIMAc and Me5IMAc are not soluble in butyl acetate. They often lead to residues of solid in the coating material on application.

In contrast to the other products, tButBuIMAc has a deep brown inherent color which renders it poorly suited to clearcoat application.

Example Series 2

The colors of the gel time samples were ascertained. As a result of the high film thickness, this is a simple method for evaluating the development of color in a molding compound or, by analogy, in the coating material at room temperature:

| Catalyst | | JONCRYL ® 507 Directly after mixing | JONCRYL ® 507 14-day storage at room temperature | JONCRYL ® S028 direct | JONCRYL ® S028 14 days |
|---|---|---|---|---|---|
| EMIMBz | Ex. | colorless | colorless | colorless | colorless |
| EEIMAc | Comp. | yellowish | yellowish | colorless | yellow |
| EEIMOct | Comp. | yellow | yellow | colorless | yellow |
| EMIMEtHex | Comp. | colorless | colorless | yellowish | yellowish |
| EMIMPiv | Comp. | colorless | colorless | colorless | colorless |
| PrPrIMAc | Comp. | yellow | yellow | colorless | yellowish |
| PrPrIMOct | Comp. | | | yellowish | yellowish |
| Me5IMAc | Comp. | yellowish | yellowish | yellowish | yellowish |

Apart from the EMIM benzoate, only the specimens with the organometallic catalysts, TEDA and EMIM pivalate are colorless. The latter is solid and therefore relatively difficult to incorporate. The other imidazolium carboxylates with aliphatic carboxylates are yellowish to yellow with one or another polyol. As shown in the other experiments, the organometallic catalysts exhibit disadvantages in terms of cure behavior (slower development of hardness for a given gelling time).

Example Series 3

In the case of the development of pendulum hardness at RT, the EMIM benzoate as a catalyst of the reaction of BASONAT® HI 100 with JONCRYL® 507 scores better over the overall storage time of the coating materials at RT than the imidazolium carboxylates with aliphatic carboxylates and TEDA. With DBTL, a higher ultimate hardness is achieved after 7 days at RT+15 hours at 60° C. than with EMIM benzoate, but it takes 7 days at RT for the hardness to approach that with EMIM benzoate catalysis. In the context of coatings application, the combination of rapid initial hardness and high ultimate hardness is an advantage.

TABLE 3

Comparison of the pendulum hardness in swings with 7.6 g of BASONAT® HI 100, 20.0 g of JONCRYL® 507, 10.3 g of butyl acetate and catalyst in the stated amount relative to the overall batch, with a comparable gelling time of around 3-4:30 hours. The pendulum hardness was determined after 1; 4 and 7 days at RT and also after 7 days at RT and 15 hours at 60° C.

| | | Amount of catalyst | 1 day RT | 4 days RT | 7 days RT | 7 days RT + 15 h 60° C. | Gel time [h:min] |
|---|---|---|---|---|---|---|---|
| EMIMBz | Ex. | 0.29% | 66 | 88 | 88 | 94 | 4:30 |
| DBTL | Comp. | 0.0063% | 4 | 59 | 87 | 100 | 4:24 |
| TEDA | Comp. | 0.55% | 51 | 56 | 56 | 93 | 3:22 |
| EEIMAc | Comp. | 0.18% | 45 | 46 | 44 | 61 | 3:21 |
| EEIMOct | Comp. | 0.21% | 45 | 52 | 46 | 66 | 3:08 |
| EMIMEtHex | Comp. | 0.21% | 58 | 73 | 74 | 90 | 3:24 |
| EMIMPiv | Comp. | 0.16% | 59 | 70 | 69 | 86 | 3:32 |

EMIM benzoate has the rapidest development of hardness at room temperature, especially the values for 1 day and 4 days at room temperature. The ultimate hardness (simulated by storage for 7 days at room temperature and subsequent curing at 60° C. for 15 hours) is the best for EMIMBz, DBTL and TEDA. A combination of rapid curing and high ultimate hardness is desirable.

Example Series 4

At a cure temperature of 80° C., there is a drop in hardness relative to the values for 60° C. curing in the case of the imidazolium carboxylates with aliphatic carboxylates as catalyst in the reaction of BASONAT® HI 100 with JONCRYL® 507. An exception is pentamethylimidazolium acetate, which had a lower pendulum hardness even on 60° C. curing (poor solubility, particles in the coating).

TABLE 4

Comparison of the pendulum hardnesses on curing at different storage temperatures of the coating metal panels for a comparable gelling time of around 3-4:30 hours. Specimens produced with 7.6 g of BASONAT® HI 100, 20.0 g of JONCRYL® 507, and catalyst in the stated amount relative to the overall batch, and a total of 10.3 g of butyl acetate.

| | | Amount of catalyst | 1 d RT | 30 min 60° C. + 1 d RT | 30 min 80° C. + 1 d RT | Remarks | Gel time [h:min] |
|---|---|---|---|---|---|---|---|
| EMIMBz | Ex. | 0.29% | 66 | 85 | 84 | Best | 4:30 |
| DBTL | Comp. | 0.0063% | 4 | 13 | 49 | low values | 4:24 |
| TEDA | Comp. | 0.55% | 51 | 89 | 85 | drop at 80° C. | 3:22 |
| EEIMAc | Comp. | 0.18% | 45 | 81 | 48 | drop at 80° C. | 3:21 |
| EEIMOct | Comp. | 0.21% | 45 | 86 | 51 | drop at 80° C. | 3:08 |
| EMIMEtHex | Comp. | 0.21% | 58 | 66 | 32 | drop at 80° C. | 3:24 |
| EMIMPiv | Comp. | 0.16% | 59 | 54 | 20 | drop at 80° C. | 3:32 |

It has been shown that only for EMIM benzoate was there an increase in the pendulum hardness with the curing temperature over the 60 to 80° C., whereas this did not apply to the noninventive imidazolium salts with aliphatic carboxylates.

In the case of PrPrIMAc and Me5IMAc there were solubility problems.

From tables 3 and 4 on page 40 of WO 2011/061314 it was already apparent that in the curing of a polyisocyanate with the polyacrylate polyol Joncryl® 507, the pendulum hardnesses on curing at 30 min at 60° C.+24 h at room temperature were poorer in 7 out of 10 examples as compared with 30 min at 40° C.+24 h at room temperature. In the examples of tables 4a and 4b, a drop was found for all of the catalysts with aliphatic carboxylates of 80° C. relative to 60° C., including the three for which the pendulum hardnesses found in WO 2011/061314 at 60° C. still were higher than at 40° C.

Normally, in the case of a higher temperature of curing of polyisocyanate with polyol, there is also a more rapid development of pendulum hardness. Users must be able to rely on this expected curing and drying behavior.

The pentamethylimidazolium acetate and 1,3-diisopropylimidazolium acetate described as good in WO 2007/090755 have poor solubility, and so can preferably be incorporated by stirring only in solution in acetone as solvent and using a Dispermat, but not by hand. Acetone is undesirable in coating applications, since it is readily flammable and has a flash point of below −20° C.

TABLE 5

7.0 g of BASONAT ® HI 100, 20 g of JONCRYL ® S028,
12.5 g of butyl acetate and the quantities of catalyst indicated
in the table were mixed with one another, applied as a coating,
and cured under the stated conditions. The gel time was
about 3 hours in each case.

| | | Amount of catalyst | 1 d RT | 30 min 60° C. + 1 d RT | 30 min 80° C. + 1 d RT | Gel time [h:min] |
|---|---|---|---|---|---|---|
| EMIMBz | Ex. | 0.30% | 93 | 126 | 133 | 03:12 |
| DBTL | Comp. | 0.012% | 45 | 62 | 120 | 02:51 |
| TEDA | Comp. | 0.58% | 84 | 124 | 136 | 03:28 |
| EEIMAc | Comp. | 0.175% | 81 | 125 | 127 | 03:08 |
| EEIMOc | Comp. | 0.25% | 76 | 125 | 127 | 03:00 |
| PrPrIMOc | Comp. | 0.22% | 50 | 121 | 128 | 02:43 |
| EMIMEtHex | Comp. | 0.21% | 80 | 122 | 125 | 03:17 |
| EMIMPiv | Comp. | 0.18% | 87 | 116 | 128 | 03:19 |

EMIM benzoate displays more rapid curing for a comparable gelling time.

TABLE 6

7.1 g of BASONAT ® HI 100, 20.0 g of JONCRYL ® S028,
12.0 g of butyl acetate and the quantities of catalyst indicated
in the table were mixed with one another, applied as a coating
and cured under the stated conditions. The gel time was
about 3 hours in each case.

| Pendulum hardness | Amount of catalyst | 23° C. | 60° C. | 80° C. | 110° C. | Gel time |
|---|---|---|---|---|---|---|
| EMIMBz | 0.30% | 103 | 116 | 124 | 139 | 3:13 |
| EMIM-Ac | 0.17% | 95 | 94 | 109 | 136 | 3:09 |

EMIM benzoate displays better curing at all temperatures, with a comparable gelling time.

TABLE 7

Curing of BASONAT ® LR 9046 (7.3 g) with JONCRYL ® 507
(20.0 g) with catalysts and a total of 11.0 g of butyl
acetate. The table below reports the pendulum hardnesses
for different temperatures (24 h at 23° C.; 30 minutes
each at 60/80° C. + 24 h at 23° C.), and the gel time.

| Catalyst | Amount of catalyst | | Pendulum hardness 23° C. | 60° C. | 80° C. | Gel time h:min |
|---|---|---|---|---|---|---|
| EMIMBz | 0.29% | 0.11 g | 88 | 98 | 100 | 3:44 |
| EMIMAc | 0.22% | 0.08 g | 72 | 83 | 41 | 3:14 |

With a comparable gelling time, EMIM benzoate exhibits better curing at all temperatures. Moreover, with the EMIMAc there is again a drop in hardness when the temperature is raised from 60 to 80° C. In contrast, EMIMBz shows the desired curing behavior.

TABLE 8

Curing of BASONAT ® LR 9046 (5.5 g) with JONCRYL ® 902
(20.0 g), 11.0 g of butyl acetate, and with catalysts in the amounts
stated in the table. Moreover, the pendulum hardnesses in the swings
are reported for different temperatures (24 h at 23° C.; 30
minutes each at 60/80° C. + 24 h at 23° C.), and the gel time.

| Catalyst | Amount of catalyst | | Pendulum hardness 23° C. | 60° C. | 80° C. | Gel time h:min |
|---|---|---|---|---|---|---|
| EMIMBz | 0.29% | 0.10 g | 72 | 128 | 136 | 3:04 |
| EMIMAc | 0.22% | 0.08 g | 54 | 122 | 130 | 2:45 |

EMIM benzoate, with a comparable gelling time of approximately 03:00 h:min, exhibits better curing at all temperatures.

The invention claimed is:

1. A method of coating a substrate, the method comprising:
    applying at least one coating composition to the substrate in a desired thickness, wherein the at least one coating composition comprises the following components:
    (A) at least one polyisocyanate obtained by reacting at least one monomeric isocyanate, wherein the at least one polyisocyanate is at least one selected from the group consisting of 1,6-hexamethylenediisocyanate based isocyanurate and 1,6-hexamethylenediisocyanate based biuret,
    (B) at least one binder comprising at least two isocyanate-reactive groups, and having a number-average molecular weight Mn of from 1000 to 5000 g/mol and an OH number of from 80 to 160 mg KOH/g, wherein the at least one binder is a polyacrylate polyol, and
    (C) 1-ethyl-3-methyl-imidazolium benzoate,
        wherein a molar ratio of isocyanate groups of the component (A) to isocyanate-reactive groups of the component (B) is from 0.9:1 to 1.2:1, and
        wherein an amount of 1-ethyl-3-methyl-imidazolium benzoate (C) is from 300 to 4,000 ppm by weight,
    optionally drying the at least one coating composition applied to the substrate, by at least partly removing volatile constituents; followed by
    curing the at least one coating composition applied to the substrate.

2. The method according to claim 1, comprising mixing a premix comprising
    (B) the at least one binder, and
    (C) 1-ethyl-3-methyl-imidazolium benzoate,
    shortly before application to the substrate, with
    (A) the at least one polyisocyanate,
    and then
    optionally conducting the drying of the at least one coating composition applied to the substrate, by at least partial removal of volatile constituents, followed by
    the curing of the at least one coating composition applied to the substrate.

3. The method according to claim 1, wherein the curing is carried out at a temperature of below 110° C.

4. The method according to claim 1, wherein the at least one coating composition has a solids content of more than 58% with a flow time (DIN 4 cup) of 20 seconds at 23° C.

5. The method of claim 1, wherein the at least one coating composition is in a form selected from the group consisting of a paint, a varnish, an adhesive, a primer and a troweling composition.

6. The method according to claim 1, wherein a molar ratio of isocyanate groups of the component (A) to isocyanate-reactive groups of the component (B) is from 0.9:1 to 1.1:1.

7. A coating material for coating a substrate, the coating material comprising the following components:
- (A) at least one polyisocyanate obtained by reacting at least one monomeric isocyanate, wherein the at least one polyisocyanate is at least one selected from the group consisting of 1,6-hexamethylenediisocyanate based isocyanurate and 1,6-hexamethylenediisocyanate based biuret,
- (B) at least one binder comprising at least two isocyanate-reactive groups, and having a number-average molecular weight Mn of from 1000 to 5000 g/mol and an OH number of from 80 to 160 mg KOH/g, wherein the at least one binder is a polyacrylate polyol, and
- (C) 1-ethyl-3-methyl-imidazolium benzoate,
  wherein a molar ratio of isocyanate groups of the component (A) to isocyanate-reactive groups of the component (B) is from 0.9:1 to 1.2:1, and
  wherein an amount of 1-ethyl-3-methyl-imidazolium benzoate (C) is from 300 to 4,000 ppm by weight.

8. A premix for coating a substrate, the premix comprising:
- (B) at least one binder comprising at least two isocyanate-reactive groups, and having a number-average molecular weight Mn of from 1000 to 5000 g/mol and an OH number of 80 to 160 mg KOH/g, wherein the at least one binder is a polyacrylate polyol,
- (C) 1-ethyl-3-methyl-imidazolium benzoate,
  wherein an amount of 1-ethyl-3-methyl-imidazolium benzoate (C) is from 300 to 4,000 ppm by weight.

* * * * *